(12) United States Patent
Kalbo (10) Patent No.: US 12,363,003 B2
(45) Date of Patent: *Jul. 15, 2025

(54) PROACTIVE INSPECTION TECHNIQUE FOR IMPROVED CLASSIFICATION

(71) Applicant: FORESCOUT TECHNOLOGIES, INC., San Jose, CA (US)

(72) Inventor: Naor Kalbo, Givatayim (IL)

(73) Assignee: Forescout Technologies, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/664,559

(22) Filed: May 15, 2024

(65) Prior Publication Data

US 2024/0297826 A1 Sep. 5, 2024

Related U.S. Application Data

(63) Continuation of application No. 18/056,561, filed on Nov. 17, 2022, now Pat. No. 12,009,986.

(60) Provisional application No. 63/326,670, filed on Apr. 1, 2022.

(51) Int. Cl.
*H04L 41/12* (2022.01)
*H04L 41/22* (2022.01)
*H04L 67/02* (2022.01)
*H04L 67/51* (2022.01)

(52) U.S. Cl.
CPC .............. *H04L 41/12* (2013.01); *H04L 41/22* (2013.01); *H04L 67/02* (2013.01); *H04L 67/51* (2022.05)

(58) Field of Classification Search
None
See application file for complete search history.

(56) References Cited

U.S. PATENT DOCUMENTS

| | | | |
|---|---|---|---|
| 7,702,772 B2 * | 4/2010 | Kurup | H04L 63/0281 709/224 |
| 8,635,350 B2 * | 1/2014 | Gutt | H04L 61/103 709/229 |
| 9,455,872 B2 * | 9/2016 | Lingen | H04L 41/0806 |
| 10,263,863 B2 * | 4/2019 | Mukerji | H04L 41/12 |
| 10,523,543 B2 * | 12/2019 | Spinelli | H04L 67/51 |
| 11,709,945 B2 * | 7/2023 | Carey | G06F 21/50 |
| 2004/0095943 A1 * | 5/2004 | Korotin | H04L 61/10 370/395.54 |
| 2006/0279774 A1 * | 12/2006 | Matsuoka | H04L 12/2809 358/1.15 |
| 2008/0209028 A1 * | 8/2008 | Kurup | H04L 67/564 709/224 |
| 2009/0086688 A1 * | 4/2009 | Kvache | H04L 12/2812 370/338 |
| 2010/0305990 A1 * | 12/2010 | Tyree | G06Q 10/06 709/224 |

(Continued)

*Primary Examiner* — Lashonda Jacobs-Burton
(74) *Attorney, Agent, or Firm* — Womble Bond Dickinson (US) LLP (57) ABSTRACT

Systems, methods, and related technologies for a proactive inspection system for improved classification of devices are described. A device is discovered on a network that has a first open port number. A filename is obtained based on a likelihood that the filename is being used as a name for file content, in association with the first open port number. The file content is obtained from the device with the first open port number and the filename. The device is classified with the file content.

20 Claims, 6 Drawing Sheets

(56) References Cited

U.S. PATENT DOCUMENTS

| | | | |
|---|---|---|---|
| 2011/0082922 A1* | 4/2011 | Ahn | H04L 67/51 |
| | | | 709/223 |
| 2012/0137011 A1* | 5/2012 | Yoon | H04L 69/14 |
| | | | 709/228 |
| 2014/0372599 A1* | 12/2014 | Gutt | H04L 61/5014 |
| | | | 709/224 |
| 2018/0139104 A1* | 5/2018 | Seddigh | H04L 41/12 |
| 2019/0052584 A1* | 2/2019 | Barve | G06Q 10/04 |
| 2019/0166091 A1* | 5/2019 | Gupta | H04L 61/2571 |
| 2019/0238405 A1* | 8/2019 | Karivaradaswamy | G06F 13/10 |
| 2020/0304455 A1* | 9/2020 | Karkhanis | H04W 4/06 |
| 2022/0060500 A1* | 2/2022 | Hayman | H04L 63/1433 |
| 2022/0060978 A1* | 2/2022 | Djapic | H04W 8/005 |
| 2023/0006899 A1* | 1/2023 | Nechushtan | H04L 41/12 |
| 2023/0110265 A1* | 4/2023 | Fainberg | H04L 43/0876 |
| | | | 709/224 |

* cited by examiner

PROACTIVE INSPECTION TECHNIQUE FOR IMPROVED CLASSIFICATION

CROSS-REFERENCE TO RELATED APPLICATIONS

This application is a continuation of U.S. application Ser. No. 18/056,561, filed on Nov. 17, 2022, which claims the benefit of U.S. Provisional Application No. 63/326,670, filed Apr. 1, 2022, which are incorporated by reference herein in their entirety.

TECHNICAL FIELD

Aspects and implementations of the present disclosure relate to network monitoring, and more specifically, to a proactive inspection system for improved classification of devices on a computer network.

BACKGROUND

Computing devices may communicate with each over a computer network. In a computer network, computing devices can be communicatively coupled to each other over physically wired, optical, or wireless radio-frequency technology. A computer network can have a variety of network topologies. As technology advances, the number and variety of devices that communicate over computer networks increases. Devices that are connected to the network may perform different functions. For example, some devices may serve as a router or switch, others may provide data storage services, or act as a proxy server, and others may provide printing services. Understanding the make, model, function, or type of each device on a network may help devices find other services on the network, and provide helpful insights for network management and security.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to classification of devices or entities on a computer network. The systems and methods disclosed can be employed with respect to device classification, among other fields.

Device classification classifies the devices on a computer network. Classification may include determining a make, model number, serial number, type of device, function of the device, or software or an operating system running on the device, or a combination thereof.

Universal Plug and Play (UPnP) is a set of networking protocols that some networked devices may use to seamlessly discover each other on the network and use each other's services. The UPnP networking protocol supports device to device or entity to entity communication between consumer electronics, mobile devices, personal computers, network appliances, and other networked devices. A UPnP device may establish an IP address of another device (e.g., through a broadcast message or other means). After a device has established an IP address of another device, the next step in the UPnP networking is discovery. The UPnP discovery protocol may be referred to as the Simple Service Discovery Protocol (SSDP). When a first device connects to a network, the first device may use SSDP to advertise its services to control points on the network. To learn more about the first device and its capabilities, a second device may request the first device's description. The device description of the first device may be expressed in a file (e.g., an extensible markup language (XML) file) and include vendor-specific manufacturer information about the first device, such as a model name and number, a serial number, a vendor name, uniform resource locators (URLs), and more device information.

For example, in UPnP, with SSDP, a device A may communicate a broadcast message to request address information for where the UPnP service is located for each of the receiving devices. A device B on the network may hear this broadcast and respond with a location header of the UPnP service on that device, which may include a port number and file name. The device A may send a request to device B with the location header information to obtain a file (e.g., an XML document) that contains details and capabilities (e.g., services and functionality) of device B.

Under existing solutions, UPnP and SSDP is limited within the local area network (LAN) or to a broadcast domain for a given device. A device may obtain information about another device within the same LAN or broadcast domain, but not outside of the LAN or in a different broadcast domain. As such, UPnP is limited in its ability to obtain classification information for devices under existing solutions. Due to these limitations, systems that perform device classification do not utilize the UPnP infrastructure, such as the device description contained in the description file of UPnP devices and the UPnP service that may be included in UPnP devices.

Accordingly, systems, methods, techniques, and related technologies are described herein in various implementations that includes a network monitor entity that may discover a device on a network that has an open port with a port number (e.g., open port number '52881'). The network monitor entity may request a file from the device with a first open port number and a filename (e.g., 'simplecfg.xml'). The filename has a highest likelihood of being used as a name for the file with the port number. In response to obtaining the file from the device, the network monitor entity may classify the device with information (e.g., make, model number, serial number, vendor name, URLs, etc.) held in the file. The classification may be stored in computer-readable memory (e.g., a database), or shown to a display, or both.

The likelihood of the filename may be determined based on a statistical model, which may be built from a vast pool of UPnP devices and their port numbers and filenames. In such a manner, systems, methods, and techniques may bypass the LAN limitations inherent in the UPnP SSDP protocol, by predicting which filename to use for a discovered open port of an unknown device, and then using that filename and port number to directly request file content, without relying on a broadcast message.

In some examples, in response to a failure of obtaining the file from the device with the filename, the network monitor entity may request the file from the device with the first open port number and a second filename that has a second highest likelihood of being used as the name for the file with the first open port number. This process may be continued until the predicted filenames for a given open port number are exhausted. In such a case, the network monitor entity may attempt the same filename predicting process with a next open port number, and so on, until the file content is obtained, or until valid combinations of open port numbers and filenames are exhausted.

For example, in response to a failure of obtaining the file with the first open port number, or if all the predicted filenames for the first open port number are exhausted, or both, the network monitor entity may request the file from the device with a second open port number and a second filename that has a highest likelihood of being used as the name for the file with the second open port number. The filename may be obtained by referencing the port number in a data store or data storage (e.g., a database, a dictionary, a list, a lookup table, etc.) that comprises a plurality of port numbers. In the data storage, each of the plurality of port numbers has associated to it, one or more filenames that are ranked in order of likelihood of being used as the name for the file at a respective one of the plurality of port numbers.

In some examples, the network monitor entity may ignore a candidate filename of the one or more filenames from the data storage if a likelihood, or a success rate, or both, if the candidate filename does not satisfy a threshold. For example, if candidate filename (e.g., 'simplecfg.xml') has only a 10% likelihood, or an 8% success rate, or both, then the network monitor entity may ignore this candidate filename if a respective threshold for the likelihood, the success rate, or both, are not met. The likelihood of a filename being used with a given port number may be determined from the number of occurrences of a given filename for a given port number (e.g., '52881' with 'simplecfg.xml') as observed over many devices. This pool of information may be gathered by the network monitor entity. In some cases, the network monitor entity may obtain some or all of this information from a third party (e.g., a web-crawler). The success rate of a filename with a given port number may be a value that is updated by the network monitor entity after trying to request the file content with a filename and port number combination. For example, the network monitor may update the data storage with a result of whether or not the file was obtained from the device with the filename and the port number pair (e.g., '52881' with 'simplecfg.xml'), to update the success rate of the filename with respect to the port number in the data storage.

In some examples, the network monitor entity may perform classification for one or more devices that use UPnP or are UPnP compliant. Such devices may readily provide file content in response to a proper request. For example, the network monitor entity may request the file from the device by sending an HTTP GET request to the device, comprising an IP address of the device, the open port number of the device, and the filename of the file. The UPnP compliant device responds with the content of the file, which the network monitor entity may use to classify the device.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein. Micro-segmentation may include logically dividing a network (e.g., data center) into distinct security segments. This division may be down to the individual workload level, rather than solely IP based. Micro-segmentation defines security controls and deliver services for each unique segment.

Figure 1:
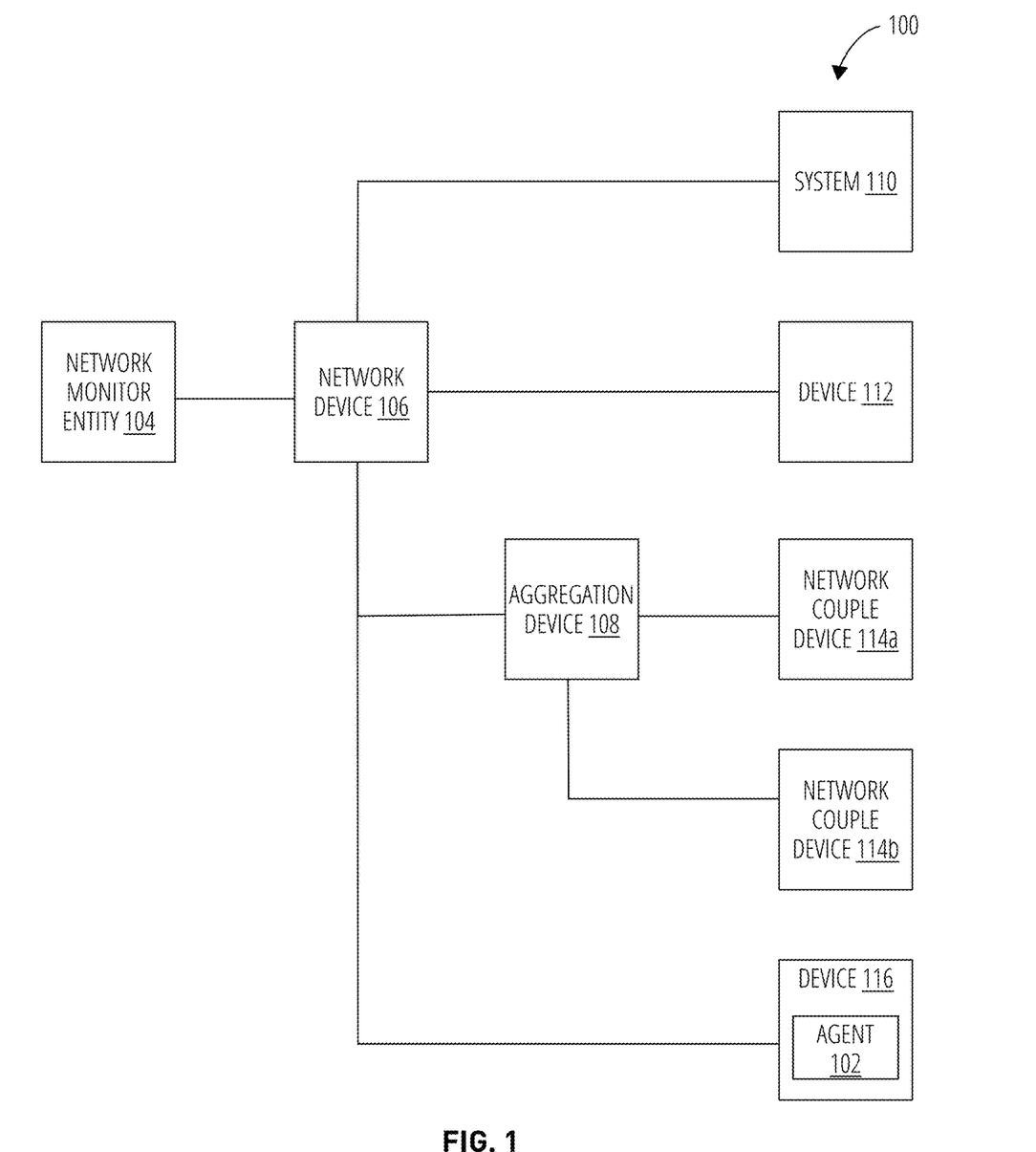
FIG. 1 depicts an example of a communication network in accordance with one implementation of the present disclosure.

FIG. 1 depicts an illustrative communication network 100, in accordance with one implementation of the present disclosure. The communication network 100 includes a network monitor entity 104, a network device 106, an aggregation device 108, a system 110, devices 112 and 116, and network coupled devices 114a and 114b. The devices 112 and 116 and network coupled devices 114a and 114b may be any of a variety of devices including, but not limited to, computing systems, laptops, smartphones, servers, Internet of Things (IOT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 106 may be one or more network devices configured to facilitate communication among aggregation device 108, system 110, network monitor entity 104, devices 112 and 116, and network coupled devices 114a and 114b. Network device 106 may be one or more network switches, access points, routers, firewalls, hubs, etc.

Network monitor entity 104 may be operable for a variety of tasks including determining data that is held on each of one or more devices on a network, determining a security risk of the device based at least on the data (e.g., whether or not the data is sensitive), and segmenting the network in response to if the security risk satisfies a threshold, such that accessibility to the offending device is reduced. In some examples, network monitor entity 104 may be operable to discover a device on a network that has a first open port number, request a file from the device with the first open port number and a filename, wherein the filename has a highest likelihood of being used as a name for the file with the first open port number, and, in response to obtaining the file from the device, classify the device with information held in the file. Network monitor entity 104 may segment the network or the device based on the classification of the device. In some embodiments, network monitor entity 104 can use local resources (e.g., processing, memory, data resources, or other resources), cloud resources, or a combination thereof for such an operation. In various embodiments, various libraries or an application programming interface (API) may be used to perform the operations of the network monitor entity 104.

Network monitor entity 104 can determine one or more enforcement points where the device is communicatively coupled to the network and thereby determine the one or more enforcement points closest to the device. For example, network monitor entity 104 may access information on a switch (e.g., a switch cache) to determine a port (e.g., physical port, wireless port, or virtual port) where a device with a particular IP address or MAC address or other identifier is communicatively coupled. Network monitor entity 104 may also access information from a wireless access point where the device is communicatively coupled. In some embodiments, network monitor entity 104 may poll information from a cloud service to determine where a device is communicatively coupled or connected to a network. In various embodiments, network monitor entity 104 access syslog or SNMP information from a device itself to determine where a device is communicatively coupled or connected to a network (e.g., without accessing information from a network device or enforcement point). Network monitor entity 104 supports applying access policies in situations where a device is communicatively coupled to a network with more than one connection (e.g., a wired connection and a wireless connection).

Based on the enforcement point, network monitor entity 104 may determine the one or more access rules to be assigned to the one or more enforcement points based on an access policy. In some embodiments, based on information about the one or more enforcement points closest to the device, network monitor entity 104 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 104 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 104 may then apply or assign the access rules to the one or more enforcement points closest to the device. Network monitor entity 104 may communicate the access rules via application programming interfaces (APIs), command line interface (CLI) commands, Web interface, simple network management protocol (SNMP) interface, etc. In some embodiments, network monitor entity 104 may verify that the one or more enforcement points have been properly or correctly configured based on the access rules.

Network monitor entity 104 may provide an interface (e.g., a graphical user interface (GUI)) for viewing, monitoring, and modifying classification or associated thresholds associated with one or more models. Network monitor entity 104 may further monitor network traffic over time to reclassify entities as new entities join the network, entities rejoin the network, and new models are made available.

Network monitor entity 104 may further perform a variety of operations including identification, classification, and taking one or more remediation actions (e.g., changing network access of a device, changing the virtual local area network (VLAN), sending an email, sending a short message service (SMS) message, etc.).

Network monitor entity 104 may also parse network traffic. For example, the network monitor entity 104 may parse (e.g., read, analyze, access, etc.) different protocol fields of the network traffic (e.g., packets, messages, frames, etc.). The network monitor entity 104 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 104 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 104 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 104 may be communicatively coupled to the network device 106 in such a way as to receive network traffic flowing through the network device 106 (e.g., port mirroring, sniffing, acting as a proxy, passive monitoring, etc.). In some embodiments, network monitor entity 104 may include one or more of the aforementioned devices. In various embodiments, network monitor entity 104 may further support high availability and disaster recovery (e.g., via one or more redundant devices).

In some embodiments, network monitor entity 104 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 104 may be based on a combination of one or more pieces of information including traffic analysis, information from external or remote systems (e.g., system 110), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 104 may be operable to use one or more APIs to communicate with aggregation device 108, device 112, device 116, or system 110. Network monitor entity 104 may monitor for or scan for entities that are communicatively coupled to a network via a NAT device (e.g., firewall, router, etc.) dynamically, periodically, or a combination thereof.

Information from one or more external or third party systems (e.g., system 110) may further be used for determining one or more tags or characteristics for a device. For example, a vulnerability assessment (VA) system may be queried to verify or check if a device is in compliance and provide that information to network monitor entity 104. External or third party systems may also be used to perform a scan or a check on a device to determine a software version.

Device 116 can include agent 102. The agent 102 may be a hardware component, software component, or some combination thereof configured to gather information associated with device 116 and send that information to network monitor entity 104. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 102 may be configured to provide different levels and pieces of information based on device 130 and the information available to agent 102 from device 116. Agent 102 may be able to store logs of information associated with device 116. Network monitor entity 104 may utilize agent information from the agent 102. While network monitor entity 104 may be able to receive information from agent 102, installation or execution of agent 102 on many entities may not be possible, e.g., IoT or smart devices.

System 110 may be one or more external, remote, or third party systems (e.g., separate) from network monitor entity 104 and may have information about devices 112 and 116 and network coupled devices 114a and 114b. System 110 may include a vulnerability assessment (VA) system, a threat detection (TD) system, endpoint management system, a mobile device management (MDM) system, a firewall (FW) system, a switch system, an access point system, etc. Network monitor entity 104 may be configured to communicate with system 110 to obtain information about devices 112 and 116 and network coupled device 114a and network couple device 114b on a periodic basis, as described herein. For example, system 110 may be a vulnerability assessment system configured to determine if device 112 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 104.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 104.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 104.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 106 or aggregation device 108) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 104 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 108 may be configured to communicate with network coupled devices 114a and 114b and provide network access to network coupled devices 114a and 114b. Aggregation device 108 may further be configured to provide information (e.g., operating system, device software information, device software versions, device names, application present, running, or both, vulnerabilities, patch level, etc.) to network monitor entity 104 about the network coupled devices 114a and 114b. Aggregation device 108 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 108 may be coupled to the network device 106 via an Ethernet connection and coupled to network coupled devices 114a and 114b via a wireless connection. Aggregation device 108 may be configured to communicate with network coupled devices 114a and 114b using a standard protocol with proprietary extensions or modifications.

Aggregation device 108 may further provide log information of activity and properties of network coupled devices 114a and 114b to network monitor entity 104. It is appreciated that log information may be particularly reliable for stable network environments (e.g., where the types of devices on the network do not change often). The log information may include information of updates of software of network coupled devices 114a and 114b.

Figure 2:
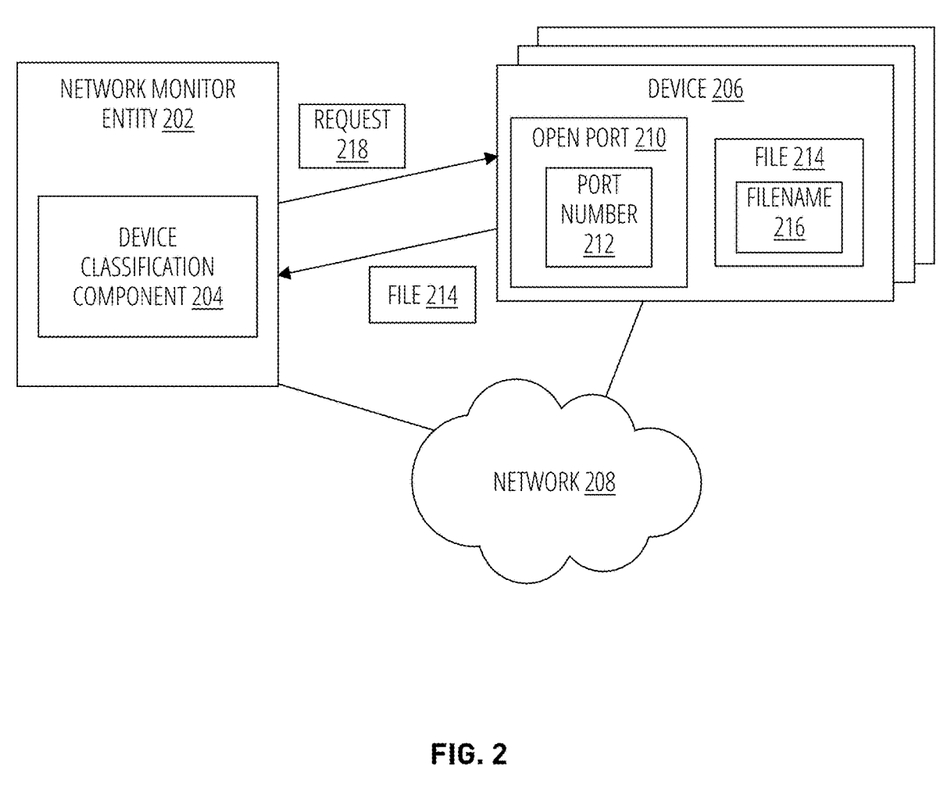
FIG. 2 depicts an example of a computer network in accordance with one implementation of the present disclosure.

FIG. 2 depicts an illustrative computer network with a network monitor entity 202 in accordance with one implementation of the present disclosure. Network 208 may represent a single computer network, or it may represent numerous computer networks which may be interconnected. For example, network 208 may include one or more local area networks that may be connected to each other through one or more network devices (e.g., a gateway). Devices 206 may be coupled to the network 208 on a different LAN than network monitor entity 202. Devices 206 may include computer servers, IoT devices (e.g., a television, sensors, appliances, medical equipment, exercise equipment, or other IoT device), IoMT entities or devices (Internet of Medical Things), personal computers, databases, mobile phones, tablet computers, operational technology (OT) (e.g., proprietary OT devices or entities), entities, or other computing devices.

Network monitor entity 202 may be communicatively coupled to the network 208. Network monitor entity 202 may, in some examples, be a network monitor entity 104. Network monitor entity 202 may include a device classification component 204. Network monitor entity 202 may discover a device such as device 206 on a network 208 that has a first open port 210 with a port number 212. Network monitor entity 202 may send a request 218 for a file 214 from the device 206 with an open port number and a filename 216. An open port number is the port number 212 of an open port 210 on the device. The filename 216 is identified by network monitor entity 202 as having a highest likelihood of being used as a name for the file 214 with that specific port number 212. In response to obtaining the file 214 from the device, network monitor entity 202 may classify the device 206 based on information held in the file 214. Network monitor 202 may further classify the device 206 based on additional information (e.g., network traffic, active probing, third-party data, etc.) in combination with the information of file 214. The file may be obtained by obtaining the file content.

To discover device 206 on the network 208, network monitor entity 202 may scan network 208. This may be performed actively (e.g., by polling devices on the network or other active discovery techniques) or passively (e.g., through analyzing network traffic or other passive discovery techniques). This discovery extends beyond the LAN of network monitor entity 202, which allows network monitor entity 202 to obtain the IP addresses and open port numbers of device 206 which may be connected to a remote LAN (e.g., including cloud based devices or entities) in network 208. In some examples, network monitor entity 202 may access information on a switch (e.g., a switch cache) to determine where a device with a particular IP address or MAC address or other identifier is communicatively coupled, and what ports are open on the device. Network monitor entity 104 may also access information from a wireless access point where the device is communicatively coupled. In some embodiments, network monitor entity 104 may poll information from a device directly, or a network device such as network device 106, or analyze network traffic, to obtain IP address and open port numbers of a device.

The network monitor entity 202 may refer to a data storage that provides the most likely filename to be used for a given port number. The filenames may be sorted and provided in the order of likelihood, such that network monitor entity 202 selects candidate filenames from most likely to least likely for a given port number. In some cases, if the likelihood of a candidate filename is below a threshold, then the network monitor entity 202 may ignore that candidate filename. The network monitor entity may then proceed to the next open port number for that device, if one exists.

In some examples, the network monitor entity 202 may also populate the data storage with the most likely filename for a given port number. The network monitor entity 202 may use statistical metrics to perform the analysis of which filenames are most likely to be used for a file in view of a given port number. For example, aggregated data (e.g., Device Cloud or other cloud based resources) may have a significant role in such a model. The aggregated data may be helpful in determining how to perform smart interrogation of devices (e.g., using a predicted filename and port number combination to obtain file information) with high accuracy while minimizing network overhead.

Aspects described in the present disclosure allow a network monitor entity 202 to access the device description information of a device 206 which is kept in file 214 beyond a local area network to improve classification. This device description information is especially valuable when trying to classify a device. Embodiments further enable classification of devices for LANs or network portions where a sensor (e.g., a network monitor entity 202 or 104) is not present. Such aspects thereby enable a sensor to classify devices on a remote LAN or several hops away. A sensor may make a valid connection to a UPnP-enabled device, without relying on the discovery protocol or the network topology limitation, resulting in the ability to query the UPnP-enabled device's description file. Network monitor entity 202 or a different device may use the description file for classification of the device 206.

Device 206 may respond to a requested device description file 214, in response to a specific valid request. A request may be valid when the correct port number and filename is used. For example, the network monitor entity 202 may send a request with the IP address of the device, concatenated with the port number and file name, such as: "http://10.1.0.1:49152/rootdesc.xml". In such an example, "10.1.0.1" is the IP address of the device 206, "49152" is the port number, and "rootdesc.xml" is the filename 216. The IP address and the port number 212 of one or more open ports are discovered by the network monitor entity 202 through scanning, as described.

The filename 216 may be predicted in view of a statistical model that includes the number of occurrences of a filename for a particular port number, with respect to the total number of occurrences of that port number being used for a UPnP service. The statistical model indicates how often UPnP enabled devices use that filename as the name of the file 214 when using that same port number, compared to other filenames when using that port number. Thus, to craft the request message, the network monitor entity 202 may include or refer to a recommendation system that provides a filename to use in requesting the file 214 for a particular open port number 212. The recommendation system, which may be integral to network monitor entity 202, could perform a continuous crowdsource data analysis from many data-sources (e.g., both internal and external) while extracting and storing the relevant insights as actionable data in data storage.

In such a manner, enhanced and improved classification may leverage UPnP devices to perform discovery on remote LANs. A sensor (e.g., network monitor entity 202) need not be attached to each individual LAN. UPnP may be used to query device 206 which may be multiple hops away from a sensor and gather significant device information which can be used for improved classification of devices on a network 208.

Figure 3:
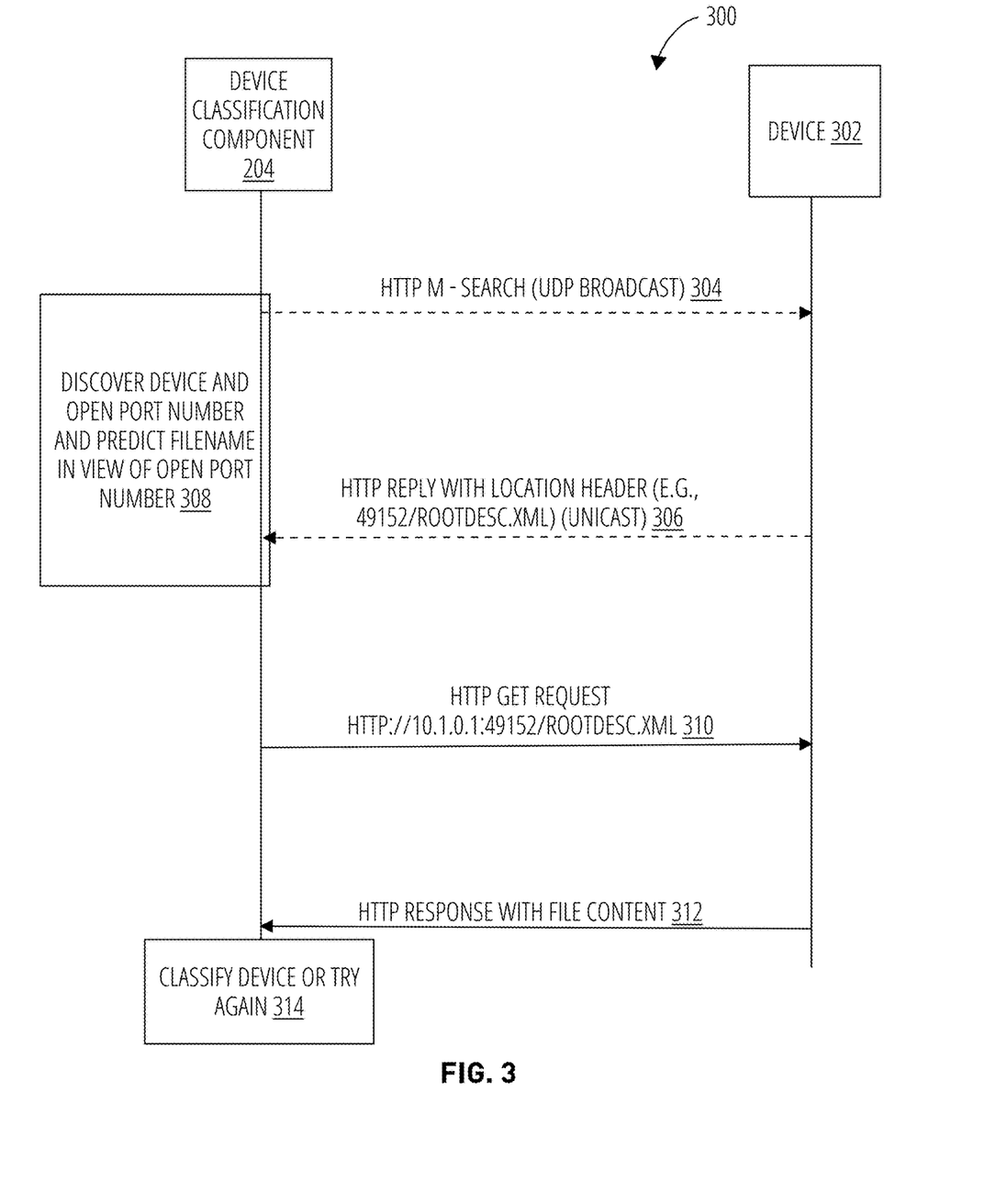
FIG. 3 shows an example flow diagram in accordance with one implementation of the present disclosure.

FIG. 3 shows an example flow diagram 300 in accordance with one implementation of the present disclosure. Device classification component 204 may be hosted on one or more entities such as network monitor entity 104 and network monitor entity 202. Device 302 may be a device such as device 206 that is communicatively coupled to a network. Device classification component 204 may be communicatively coupled to a different LAN than device 302.

Blocks 304 and 306 indicate traditional SSDP protocol. As described, a UPnP enabled device may, at block 304, communicate a broadcast message to request address information for where the UPnP service of device 302 is located. In some examples, the broadcast message may include an M-search via HTTP. This broadcast message may be sent using a UDP broadcast message. This broadcast message may go out to each of the receiving devices (such as device 302) which are connected to the same LAN as the broadcasting device (e.g., component 204). A device 302 on the same LAN may, at block 306, receive this broadcast and respond with a location header of the UPnP service on that device, which may include a valid port number and filename to obtain the description file of the device 302. For example, the device 302 may reply with an HTTP message that includes the location header (e.g., 49152/ROOT-DESC.XML). This may be performed as a unicast message.

As described, however, blocks 304 and 306 are limited in scope by the broadcast message, which may be a User Datagram Protocol (UDP) broadcast message. The broadcast message may, by design, travel within the LAN of the originating broadcasting device, but not beyond. To overcome this limitation, device classification component 204 may perform block 308 to obtain the location header information of the UPnP service of device 302, through a statistical model, as described, and bypass blocks 304 and 306.

At block 308, device classification component 204 may scan a network which may include the LAN that the device classification component 204 is connected to, and remote LANs, to determine which devices are connected to the network, and what the open port numbers are on each device. Through discovery, the device classification component 204 may discover that device 302 has a first open port number '49152'. In some cases, device classification component 204 may discover that device 302 has two or more open ports. Device classification component 204 may refer to a statistical model (e.g., held in data storage) to determine which port is most likely (or most often) used by UPnP devices to provide the description file. As such, in some embodiments, the device classification component 204 can discover device and open port number and use that to predict the filename, without performing block 304 or block 306 or both. Block 304 and block 306 may be optional.

At block 310, device classification component 204 may send a request with the location header to obtain the description file (e.g., an XML document) that contains details and capabilities (e.g., model, manufacturer, serial number, product type, product description, services, functionality, or other information) of the device 302. For example, device classification component 204 may request the file from the device 302 with the port number (e.g., '49152') of the first open port and a filename (e.g., 'rootdesc.xml') which is obtained by device classification component 204 at block 308. The filename 'rootdesc.xml' may be determined as having a highest likelihood of being used as a name for the file with the port number (e.g. "49152").

At block 312, the device 302 may reply with the file content. Blocks 310 and blocks 312 may be performed as an HTTP GET request and response. HTTP works as a request-response protocol between a client and server. A client (e.g., device classification component 204) may send an HTTP request to the server (e.g., device 302) then the server returns a response to the client. The response (at block 312) may contain information about the request and also the requested content. If the request is valid (e.g., with the proper port number and filename), then device 302 will respond with the requested content. If the request is invalid (e.g., the wrong port number, the wrong filename, or both) at block 310, then the response at block 312 may not include the requested content.

At block 314, in response to obtaining the file from the device 302, device classification component 204 may classify the device 302 with information held in the file. For example, device classification component 204 may store the make, model, device type (e.g., a loudspeaker, a sensor, a television, a printer, etc.) in data storage, which may be accessible for other devices to use to connect to such devices. Device classification information may also be used by network administrators to track devices on the network for load management or network security purposes.

If, at block 314, the device classification component 204 has failed to obtain the file of device 302, the device classification component 204 may refer to the statistical model to determine which is the next most likely port number and filename combination, and repeat block 310 with that combination. In some cases, this may be repeated by device classification component 204 until all likely combinations are exhausted, or until the file content is received at block 312, or whichever comes first.

In such a manner, the device classification component 204 may leverage and obtain the description file of device 302 and others like it, regardless of whether a sensor (e.g., a host of device classification component 204) is connected to the LAN on which device 302 is connected. Device classification component 204 may directly obtain the device description of a device, through discovery and prediction of the filename used by the device.

Figure 4:
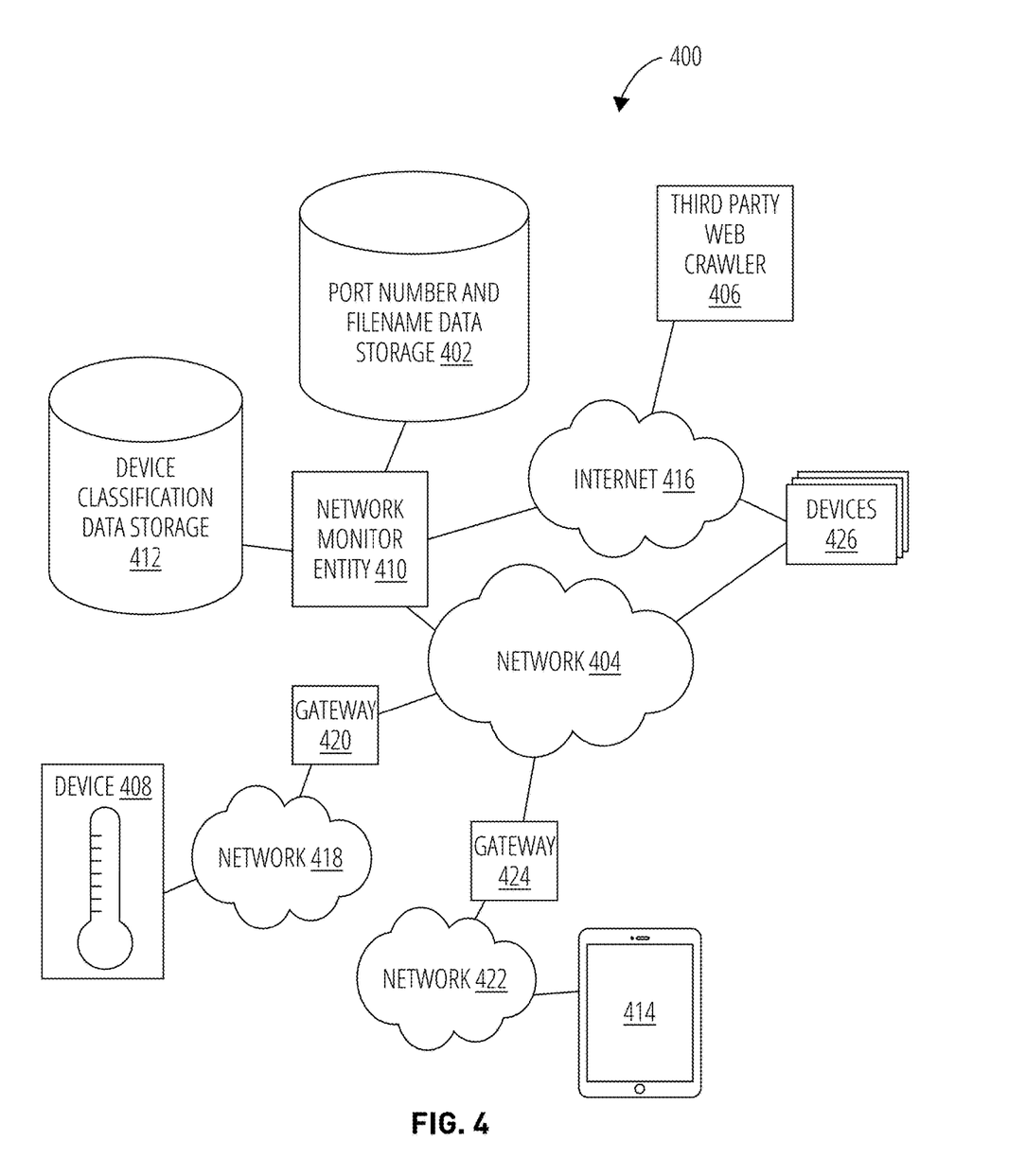
FIG. 4 shows an example of a computer network using a third party web crawler in accordance with one implementation of the present disclosure.

FIG. 4 shows an example of a computer network 400 using a third party web crawler in accordance with one implementation of the present disclosure.

A network monitor entity 410 may obtain statistical information from a plurality of devices 426 which may be connected in network 404 or on the internet 416, or both, by gathering a large pool of data that identifies, for each of devices 426, where the UPnP service for that device is located. For each device 426, network monitor entity obtains which port number and filename combination is being used for the UPnP service to provide the device's file description. In some examples, network monitor entity 410 may obtain some or all of this statistical information from a third party web crawler 406 such as, for example, Shodan, Censys, or other third party web crawler.

Although manufacturers of devices 426 may arbitrarily select a port number and filename for the UPnP service, manufacturers often use the same filename or the same few filenames and the same or the same few port numbers. Further, manufacturers tend to use the same filename with the same port number. By analyzing a large pool of data from various devices, network monitor entity 410 may draw correlational relationships between the port numbers and filenames. Network monitor entity 410 may determine, overall, which port numbers are used most often, and which filenames are used most often with each port number. The more often a filename is used for a given port number, the more likely that filename will be used for an unknown device with that open port number. Network monitor entity 410 may then store these correlational relationships in data storage 402, and use them to identify which filenames to use for classification of other devices such as device 408 or 414. Device 408 may be an IoT device (e.g., a sensor) located on a remote LAN 418 connected to network 404 through a gateway 420. Similarly, device 414 may be a mobile device connected on a remote LAN 422 connected to network 404 through gateway 424. Device 408 and 414 may each be UPnP enabled devices.

As shown in table 1 below, after analyzing 50,000 UPnP enabled devices, network monitor entity 410 may store the correlations between filename and port number, as well as a probability that the filename was used for a port number (based on the original 50,000 devices) and a success rate that may be updated to show how well filenames are performing with new devices.

TABLE 1

| Port Number | Filename | Probability | Success Rate |
|---|---|---|---|
| 52881 | simplecfg.cfg | 6200/6200 = 1 | .75 |
| 5000 | desc-dsm-eth0.xml | 4291/6309 = .68 | .38 |
| 5000 | desc-dsm-eth1.xml | 734/6309 = .11 | .42 |
| ... | ... | ... | ... |
| 2048 | gatedesc.xml | 3296/3296 = 1 | 1 |

For example, network monitor entity 410 may recognize that port number '52881' was used as the location for the UPnP service on 6200 devices (of devices 426). Further, network monitor entity 410 may recognize that 'simplecfg.cfg' was the filename for the description file at all 6200 of those occurrences when the port number was '52881'. As such, network monitor entity 410 may store, in data storage 402, port number '52881' and 'simplecfg.cfg' as the most likely filename for that port number '52881'.

Network monitor entity 410 may scan network 404 and determine that device 408 with IP of '100.100.1.10' has an open port number '52881'. Network monitor entity may reference data storage 402 for what filename has a highest likelihood of being the name of the description file with that open port number '52881'. Data storage 402 may show that 'simplecfg.cfg' has a highest likelihood, with a probability of '1'. Network monitor entity 410 may send a request to device 408 with the port number '52881' and filename 'simplecfg.cfg'.

If the device 408 responds with the file, then network monitor entity 410 may determine classification information (e.g., make, model number, serial number, etc.) for device 408 and store it in data storage 412. If not, network monitor entity 410 may check data storage 402 for the next most likely name for that port number '52881'. If are no more filenames for that port number (as is the case in this example), then network monitor entity 410 may repeat the process with the next open port number on device 408. If device 408 also has port 2048 open (which network monitor entity 410 may determine through discovery), then network monitor entity 410 may refer to data storage 402 and obtain 'gatedesc.xml' as the most likely filename for that port '2048', and send another request to device 408. In some examples, the process may repeat until each of the open ports of device 408 with all the likely filenames in data storage 402 are exhausted.

In some examples, network monitor entity 410 may ignore a candidate filename (which may be understood as any filename in data storage 402) from the data storage 402, if a probability, or success rate, or both, does not satisfy a respective threshold. For example, if network monitor entity 410 discovers that device 414 has an open port number 5000, network monitor entity 410 may try to send a first request to device 414 with filename 'desc-dsm-eth0.xml' at port 5000. If that fails, network monitor entity 410 may obtain the next most likely filename for that port, which in this case, is example 'desc-dsm-eth1.xml'.

The probability for each filename may be calculated and stored as the number of occurrences that the filename was used for a given port number in a dataset (e.g., throughout devices 426), with respect to the total number of occurrences of that port number in that dataset. In this example, if the probability '0.11' falls below the threshold, network monitor entity 410 may skip the candidate filename 'desc-dsm-eth1.xml' and move on to the next filename or next open port number. Similarly, if the success rate of '0.42' does not satisfy a threshold, then network monitor entity 410 may skip 'desc-dsm-eth1.xml' and move on to the next filename or next open port number.

Each time a device (e.g., device 408 or device 414) responds to a request from network monitor entity 410, network monitor entity 410 may update the data storage 402 with a result of whether or not the file was obtained from the device with a filename and port number combination. For example, the network monitor entity may update the success rate of the filename with respect to the port number in the data storage. If the file is successfully obtained, the success rate for that filename with that port number will increase, and conversely, if the file is not successfully obtained, the success rate for that filename with that port number will decrease. Thus, the success rate may store a ratio of how many times a filename has been used by network monitor entity 410, and how many of those attempts were successful. The network monitor entity 410 may use the success rate to ignore candidate filenames that do not have a history of working well.

In some examples, if multiple ports are open on a discovered device, then network monitor entity 410 may choose the first open port number based on which port number is most likely to be used for the UPnP service. For example, the occurrence of a port number used for the UPnP service may be stored data storage 402, and the port number with the highest occurrence may be chosen first to be used for requesting the file.

In other examples, network monitor entity 410 may choose the first open port number based on the highest probability of a filename with the port number. For example, if a port number has a probability of '1' with a filename, then it that port number may be selected, even if other port numbers are open. This may reduce the number of requests using filenames with low probability and prioritize attempts with port numbers with significant filename clustering. In some examples, the network monitor entity 410 may pick an open port number to use based on a combination of such factors.

Figure 5:
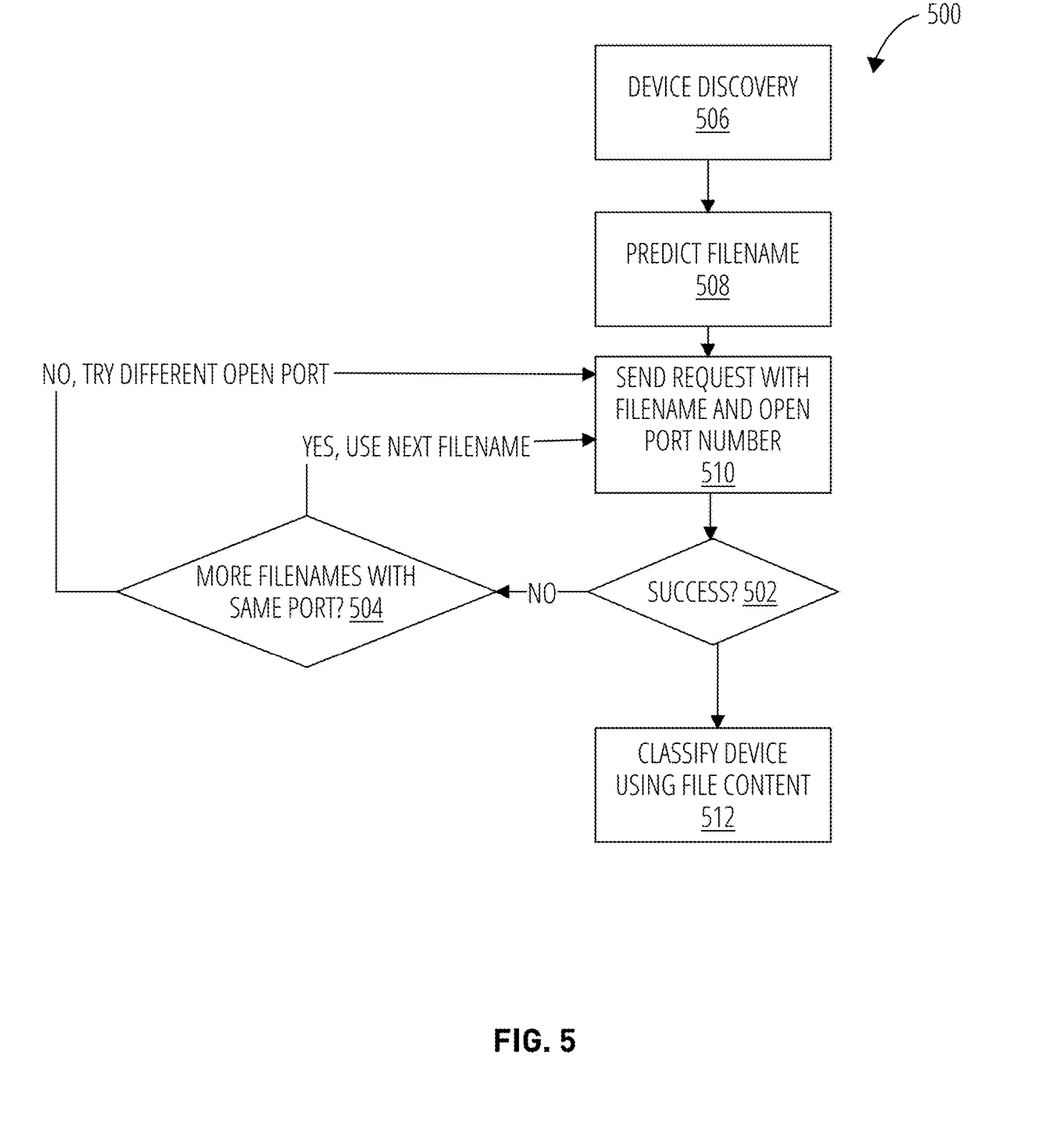
FIG. 5 shows an example of a process with classification of devices or entities based on predicted filenames with one implementation of the present disclosure.

FIG. 5 shows an example of a process 500 with classification of devices based on predicted filenames with one implementation of the present disclosure. Some or all of process 500 may be performed by one or more components (e.g., components of system 600) of an entity or device (e.g., network monitor entity 104, 202, 410, device classification component 204, etc.).

At block 506, the process includes performing device discovery. Performing device discovery may include scanning a network with active techniques, passive techniques, or both, to obtain the IP address of one or more communicatively coupled devices or entities, and the port numbers of one or more UPnP open ports of that device. The connected device may be on a remote LAN with respect to a device that is performing the process 500.

At block 508, the process includes predicting a filename for a first open port. As described, the filename may be obtained as the most likely filename for a given port number, based on which filename has the most occurrences among devices using that port number for the UPnP service (e.g., based on data in a data storage).

At block 510, the process includes sending a request based on the open port number and the filename to obtain the file content from the device. The request may include an HTTP GET request with the IP address of the device, the port number, and filename, each of which may be concatenated.

At block 502, the process may receive a response to the request, and read the response to determine if the file content with the device description information is present in the response. If the file content is present, then the process may proceed to block 512 and classify the device using the device description information (and optionally any other available information available) in the file content.

If the file content is not present in the device's response, the process may deem the request with that filename at that port number to be unsuccessful, and proceed to block 504. At block 504, the process may check for additional filenames with the same port. For example, the process may obtain the next most likely filename at that port number and proceed to block 510 to send the request with the next most likely filename and the same port number. If there are no more candidate filenames for that port number, or the candidate filenames do not satisfy a threshold probability or success rate, then the process may proceed to the next open port number of the device, obtain the most likely filename for the next open port number, and proceed to block 510 to send the request at the next open port number. In such a manner, the process may support obtaining the file content using multiple ports and multiple filenames, or any combination thereof.

Figure 6:
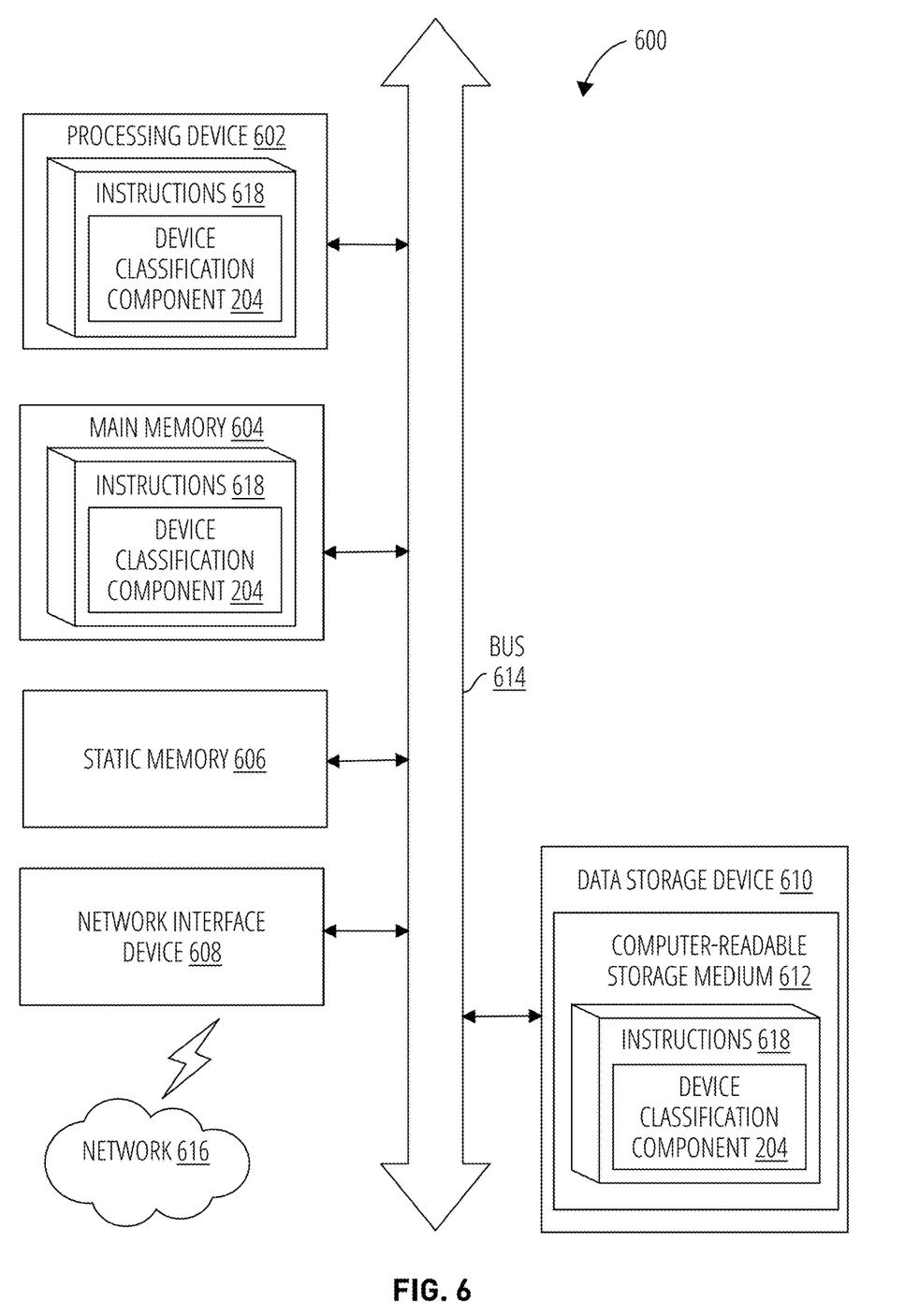
FIG. 6 is a block diagram illustrating an example computer system, in accordance with one implementation of the present disclosure.

FIG. 6 is a block diagram illustrating an example computer system 600, in accordance with one implementation of the present disclosure. This can be understood as a diagrammatic representation of a machine in the example form of a computer system within which a set of instructions, for causing the machine to perform any one or more of the methodologies discussed herein, may be executed. For example, the computing device may discover a device on a network that has a first open port number. The computing device may request a file from the device with the first open port number and a filename. The filename has a highest likelihood of being used as a name for the file with the first open port number. In response to obtaining the file from the device, the computing device may classify the device with information held in the file.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server, such as network monitor entity 104, 202 running a device classification component 204 as described herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 610, which communicate with each other via a bus 614. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to operate as a device classification component 204, as discussed herein.

The data storage device 610 may include a machine-readable computer-readable storage medium 612, on which is stored one or more set of instructions 618 (e.g., software) embodying any one or more of the methodologies of operations described herein, including instructions to cause the processing device 602 to execute device classification component 204. The instructions 618 may also reside, completely or at least partially, within the main memory 604 or within the processing device 602 during execution thereof by the computer system 600; the main memory 604; and the processing device 602 also constituting machine-readable storage media. The instructions 618 may further be transmitted or received over a network 616 via the network interface device 608.

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, performed by a processing device, comprising:
    discovering a device on a network that has a first open port number;

obtaining, by the processing device, a filename based on likelihood of the filename being used as a name for file content, in association with the first open port number;

requesting the file content from the device with the first open port number and the filename; and in response to obtaining the file content from the device, classifying the device with the file content.

2. The method of claim 1, wherein the filename has a highest likelihood of being used as the name for the file content, and the method further comprises: in response to failing to obtain the file content from the device with the filename and the first open port number, requesting the file content from the device with the first open port number and a second filename that has a second highest likelihood of being used as the name for the file content in association with the first open port number.

3. The method of claim 1, wherein the filename has a highest likelihood of being used as the name for the file content, and the method further comprises: in response to a failure of obtaining the file content with the first open port number, requesting the file content from the device with a second open port number and a second filename that has a highest likelihood of being used as the name for the file content, in association with the second open port number.

4. The method of claim 1, wherein obtaining the filename includes referencing the first open port number in a data storage that comprises a plurality of port numbers, wherein each of the plurality of port numbers has associated to it, one or more filenames that are ranked in order of likelihood of being used as the name for the file content at a respective one of the plurality of port numbers.

5. The method of claim 4, further comprising ignoring a candidate filename of the one or more filenames from the data storage if a probability or a success rate of the candidate filename does not satisfy a probability threshold or a success rate threshold.

6. The method of claim 5, further comprising updating the success rate of the filename with respect to the first open port number in the data storage, in view of whether the file content was obtained from the device with the filename and the first open port number.

7. The method of claim 1, wherein the device is universal plug and play (UPnP) enabled.

8. The method of claim 1, wherein requesting the file content from the device includes sending an (hypertext transfer protocol) HTTP GET request to the device, the HTTP GET request comprising an IP address of the device, the first open port number of the device, and the filename associated with the file content.

9. A non-transitory computer readable medium having instructions encoded thereon that, when executed by a processing device, cause the processing device to:

discover a device on a network that has a first open port number;

obtain, by the processing device, a filename based on likelihood of the filename being used as a name for file content, in association with the first open port number;

request the file content from the device with the first open port number and the filename; and in response to obtaining the file content from the device, classify the device with the file content.

10. The non-transitory computer readable medium of claim 9, wherein the filename has a highest likelihood of being used as the name for the file content, and wherein the processing device is further to: in response to failing to obtain the file content from the device with the filename and the first open port number, request the file content from the device with the first open port number and a second filename that has a second highest likelihood of being used as the name for the file content in association with the first open port number.

11. The non-transitory computer readable medium of claim 9, wherein the filename has a highest likelihood of being used as the name for the file content, and wherein the processing device is further to: in response to failing to obtain the file content with the first open port number, request the file content from the device with a second open port number and a second filename that has a highest likelihood of being used as the name for the file content, in association with the second open port number.

12. The non-transitory computer readable medium of claim 9, wherein to obtain the filename includes to reference the first open port number in a data storage that comprises a plurality of port numbers, wherein each of the plurality of port numbers has associated to it, one or more filenames that are ranked in order of likelihood of being used as the name for the file content at a respective one of the plurality of port numbers.

13. The non-transitory computer readable medium of claim 12, wherein the processing device is further to: ignore a candidate filename of the one or more filenames from the data storage if a probability or a success rate of the candidate filename does not satisfy a probability threshold or a success rate threshold.

14. The non-transitory computer readable medium of claim 13, wherein the processing device is further to: update the success rate of the filename with respect to the first open port number in the data storage, in view of whether the file content was obtained from the device with the filename and the first open port number.

15. A system, comprising:

a memory; and a processing device, operatively coupled to the memory, to:

discover a device on a network that has a first open port number;

obtain, by the processing device, a filename based on likelihood of the filename being used as a name for file content, in association with the first open port number;

request the file content from the device with the first open port number and the filename; and in response to obtaining the file content from the device, classify the device with the file content.

16. The system of claim 15, wherein the filename has a highest likelihood of being used as the name for the file content, and wherein the processing device is further to: in response to failing to obtain the file content from the device with the filename and the first open port number, request the file content from the device with the first open port number and a second filename that has a second highest likelihood of being used as the name for the file content in association with the first open port number.

17. The system of claim 15, wherein the filename has a highest likelihood of being used as the name for the file content, and wherein the processing device is further to: in response to failing to obtain the file content with the first open port number, request the file content from the device with a second open port number and a second filename that has a highest likelihood of being used as the name for the file content, in association with the second open port number.

18. The system of claim 15, wherein to obtain the filename includes to reference the first open port number in a data storage that comprises a plurality of port numbers, wherein each of the plurality of port numbers has associated to it, one or more filenames that are ranked in order of likelihood of being used as the name for the file content at a respective one of the plurality of port numbers.

19. The system of claim 18, wherein the processing device is further to: ignore a candidate filename of the one or more filenames from the data storage if a probability or a success rate of the candidate filename does not satisfy a probability threshold or a success rate threshold.

20. The system of claim 19, wherein the processing device is further to: update the success rate of the filename with respect to the first open port number in the data storage, in view of whether the file content was obtained from the device with the filename and the first open port number.

* * * * *